United States Patent
Long et al.

(10) Patent No.: US 12,280,656 B2
(45) Date of Patent: Apr. 22, 2025

(54) CARBON CANISTER WITH DIRECT CONNECT FUEL TANK ISOLATION VALVE

(71) Applicant: Stant USA Corp., Connersville, IN (US)

(72) Inventors: John C. Long, Connersville, IN (US); George J. Mitri, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 12 days.

(21) Appl. No.: 17/968,434

(22) Filed: Oct. 18, 2022

(65) Prior Publication Data

US 2023/0117796 A1    Apr. 20, 2023

Related U.S. Application Data

(60) Provisional application No. 63/257,084, filed on Oct. 18, 2021.

(51) Int. Cl.
*B60K 15/03*    (2006.01)
*B60K 15/035*    (2006.01)
(Continued)

(52) U.S. Cl.
CPC .. *B60K 15/03519* (2013.01); *B60K 15/03504* (2013.01); *B60K 2015/03296* (2013.01); *B60K 2015/03493* (2013.01); *B60K 2015/03514* (2013.01); *B60K 2015/03557* (2013.01); *F02D 41/004* (2013.01); *F02M 25/0836* (2013.01); *F02M 2025/0845* (2013.01); *F02M 25/0854* (2013.01)

(58) Field of Classification Search
CPC ............. F02M 25/089; F02M 25/0836; F02M 25/0854; F02M 2025/0845; B60K 15/03519; B60K 15/03504; B60K 2015/03514; B60K 2015/03585; B60K 2015/03296; B60K 2015/03493; B60K 2015/03557; B01D 2253/102; B01D 2259/4566; B01D 2259/4516; Y10S 137/907; F02D 41/004
USPC ................. 123/520, 516, 518, 519; 137/199, 137/493–493.9, 614.16, 907
See application file for complete search history.

(56) References Cited

U.S. PATENT DOCUMENTS

| | | |
|---|---|---|
| 3,628,517 A | 12/1971 | Soberski |
| 3,683,597 A | 8/1972 | Beveridge |

(Continued)

FOREIGN PATENT DOCUMENTS

| | | |
|---|---|---|
| CN | 205654455 | 10/2016 |
| CN | 206071758 U | 4/2017 |

(Continued)

OTHER PUBLICATIONS

PCT International Search Report and Written Opinion completed by the ISA/KR on Feb. 13, 2023 and issued in connection with PCT/US2022/046999.

(Continued)

*Primary Examiner* — Craig J Price
(74) *Attorney, Agent, or Firm* — Barnes & Thornburg LLP

(57) ABSTRACT

A fuel tank vent valve includes a venting apparatus for regulating discharge of fuel vapor from a fuel tank and admission of outside air into a fuel tank. The vent valve is used to regulate pressure in a fuel tank.

13 Claims, 6 Drawing Sheets

(51) Int. Cl.
*F02M 25/08* (2006.01)
*F02D 41/00* (2006.01)

(56) References Cited

U.S. PATENT DOCUMENTS

| | | | |
|---|---|---|---|
| 3,741,232 A | 6/1973 | Soberski | |
| 4,137,882 A * | 2/1979 | Thornburgh | F02M 25/0854 123/520 |
| 4,149,504 A * | 4/1979 | Walters | F02M 25/0854 137/907 |
| 4,193,383 A | 3/1980 | Rogers | |
| 4,203,401 A | 5/1980 | Kingsley et al. | |
| 4,280,466 A * | 7/1981 | Walters | F02M 25/0854 123/520 |
| 4,308,842 A * | 1/1982 | Watanabe | F02M 25/089 123/519 |
| 4,541,396 A * | 9/1985 | Sato | F02M 25/0836 123/518 |
| 5,148,720 A | 9/1992 | Swenson | |
| 5,501,198 A * | 3/1996 | Koyama | F02M 25/0809 123/198 D |
| 5,623,911 A * | 4/1997 | Kiyomiya | F02M 25/0854 123/520 |
| 5,632,251 A * | 5/1997 | Ishikawa | F02M 25/0854 123/519 |
| 5,809,978 A | 9/1998 | Krimmer et al. | |
| 5,878,729 A * | 3/1999 | Covert | F02M 25/0836 123/520 |
| 5,996,559 A | 12/1999 | Busato | |
| 6,073,617 A | 6/2000 | Busato | |
| 6,085,615 A | 7/2000 | Kirkendall | |
| 6,170,516 B1 | 1/2001 | Sakata | |
| 6,230,585 B1 | 5/2001 | Bator | |
| 6,328,021 B1 | 12/2001 | Perry et al. | |
| 6,431,156 B1 * | 8/2002 | Murakami | F02M 25/08 123/520 |
| 6,450,153 B1 | 9/2002 | Perry | |
| 6,453,942 B1 | 9/2002 | Perry | |
| 6,460,566 B1 | 10/2002 | Perry et al. | |
| 6,470,861 B1 | 10/2002 | Perry | |
| 6,470,908 B1 | 10/2002 | Perry | |
| 6,474,313 B1 | 11/2002 | Perry et al. | |
| 6,474,314 B1 | 11/2002 | Perry et al. | |
| 6,478,045 B1 | 11/2002 | Perry | |
| 6,484,555 B1 | 11/2002 | Perry et al. | |
| 6,502,560 B1 | 1/2003 | Perry | |
| 6,505,514 B1 | 1/2003 | Perry | |
| 6,514,326 B1 | 2/2003 | Hara et al. | |
| 6,585,230 B2 | 7/2003 | Perry | |
| 6,623,012 B1 | 9/2003 | Perry et al. | |
| 6,701,901 B2 | 3/2004 | Perry et al. | |
| 6,739,573 B1 | 5/2004 | Balsdon | |
| 6,840,232 B2 | 1/2005 | Perry | |
| 6,863,095 B2 | 3/2005 | Osaki et al. | |
| 6,878,194 B2 | 4/2005 | Hoffman | |
| 6,910,500 B2 | 6/2005 | Perry et al. | |
| 6,983,641 B1 | 1/2006 | Perry et al. | |
| 7,025,084 B2 | 4/2006 | Perry et al. | |
| 7,040,301 B2 | 5/2006 | Perry et al. | |
| 7,100,305 B2 | 9/2006 | Hoffman | |
| 7,225,798 B2 | 6/2007 | Wang et al. | |
| 7,249,595 B2 | 7/2007 | Mills et al. | |
| 7,472,694 B2 | 1/2009 | King | |
| 7,493,894 B2 | 2/2009 | Davis | |
| 7,527,044 B2 * | 5/2009 | Dunkle | F02M 25/0854 123/519 |
| 7,530,348 B2 * | 5/2009 | Wang | F02M 25/0836 123/518 |
| 8,578,914 B2 | 11/2013 | Lee et al. | |
| 9,031,721 B2 | 5/2015 | Fukui et al. | |
| 9,145,051 B2 | 9/2015 | Dudar et al. | |
| 9,163,592 B2 | 10/2015 | Kim et al. | |
| 9,216,646 B2 | 12/2015 | Yang et al. | |
| 9,217,397 B2 | 12/2015 | Peters et al. | |
| 9,243,592 B2 | 1/2016 | Dudar et al. | |
| 9,322,342 B2 | 4/2016 | Dudar et al. | |
| 9,359,977 B2 * | 6/2016 | Brock | F02M 25/0872 |
| 9,376,969 B2 | 6/2016 | Yang et al. | |
| 9,415,680 B2 | 8/2016 | Dudar et al. | |
| 9,429,114 B2 | 8/2016 | Dudar et al. | |
| 9,599,071 B2 | 3/2017 | Dudar | |
| 9,669,825 B1 | 6/2017 | Dudar | |
| 9,683,525 B2 | 6/2017 | Koller et al. | |
| 9,746,013 B2 | 8/2017 | Talley | |
| 9,834,205 B1 | 12/2017 | Dudar | |
| 10,024,281 B2 | 7/2018 | Lohr | |
| 10,167,823 B2 | 1/2019 | Dudar | |
| 10,183,660 B2 | 1/2019 | Dudar | |
| 10,458,366 B2 | 10/2019 | Brock et al. | |
| 10,544,784 B2 | 1/2020 | Hentschel | |
| 10,549,628 B2 | 2/2020 | Hagen | |
| 10,611,625 B2 | 4/2020 | Dudar | |
| 10,717,488 B2 | 7/2020 | Tani | |
| 10,850,609 B2 | 12/2020 | Vulkan et al. | |
| 10,907,583 B2 | 2/2021 | Honda et al. | |
| 11,215,147 B2 * | 1/2022 | Brock | F02M 25/0854 |
| 2006/0207576 A1 | 9/2006 | Mills et al. | |
| 2008/0223343 A1 | 9/2008 | Ammermann | |
| 2009/0101119 A1 | 4/2009 | Ammermann | |
| 2009/0255516 A1 | 10/2009 | Matsumoto | |
| 2011/0203947 A1 | 8/2011 | Ogawa | |
| 2014/0150661 A1 | 6/2014 | Himmel | |
| 2014/0345709 A1 | 11/2014 | Jefford et al. | |
| 2016/0186700 A1 | 6/2016 | Nishiura | |
| 2016/0245238 A1 | 8/2016 | Ueda | |
| 2018/0119650 A1 | 5/2018 | Brock et al. | |
| 2019/0084410 A1 | 3/2019 | Bhandari et al. | |
| 2019/0249624 A1 | 8/2019 | Seki | |
| 2019/0368431 A1 | 12/2019 | Dudar | |
| 2021/0254583 A1 | 8/2021 | Brock et al. | |
| 2023/0008621 A1 * | 1/2023 | Long | F02M 25/0836 |
| 2023/0213105 A1 * | 7/2023 | Bhandari | F16K 31/10 137/487.5 |

FOREIGN PATENT DOCUMENTS

| | | |
|---|---|---|
| CN | 206206017 U | 5/2017 |
| CN | 206338141 U | 7/2017 |
| CN | 206436819 U | 8/2017 |
| CN | 104582992 B | 11/2017 |
| CN | 108035826 A | 5/2018 |
| CN | 110385981 A | 10/2019 |
| CN | 209539471 U | 10/2019 |
| CN | 111439113 A | 7/2020 |
| CN | 211422789 | 9/2020 |
| CN | 111927959 A | 11/2020 |
| CN | 109458276 B | 12/2020 |
| CN | 212672413 U | 3/2021 |
| CN | 213838792 U | 7/2021 |
| JP | 2001020810 A | 1/2001 |
| JP | 2006258101 | 9/2006 |
| KR | 10-0648080 B1 | 12/2006 |
| KR | 1020210057508 | 5/2021 |

OTHER PUBLICATIONS

PCT International Search Report and Written Opinion completed by the ISA/KR on Feb. 13, 2023 and issued in connection with PCT/US2022/046995.

PCT International Search Report and Written Opinion completed by the ISA/KR on Feb. 13, 2023 and issued in connection with PCT/US2022/046996.

* cited by examiner

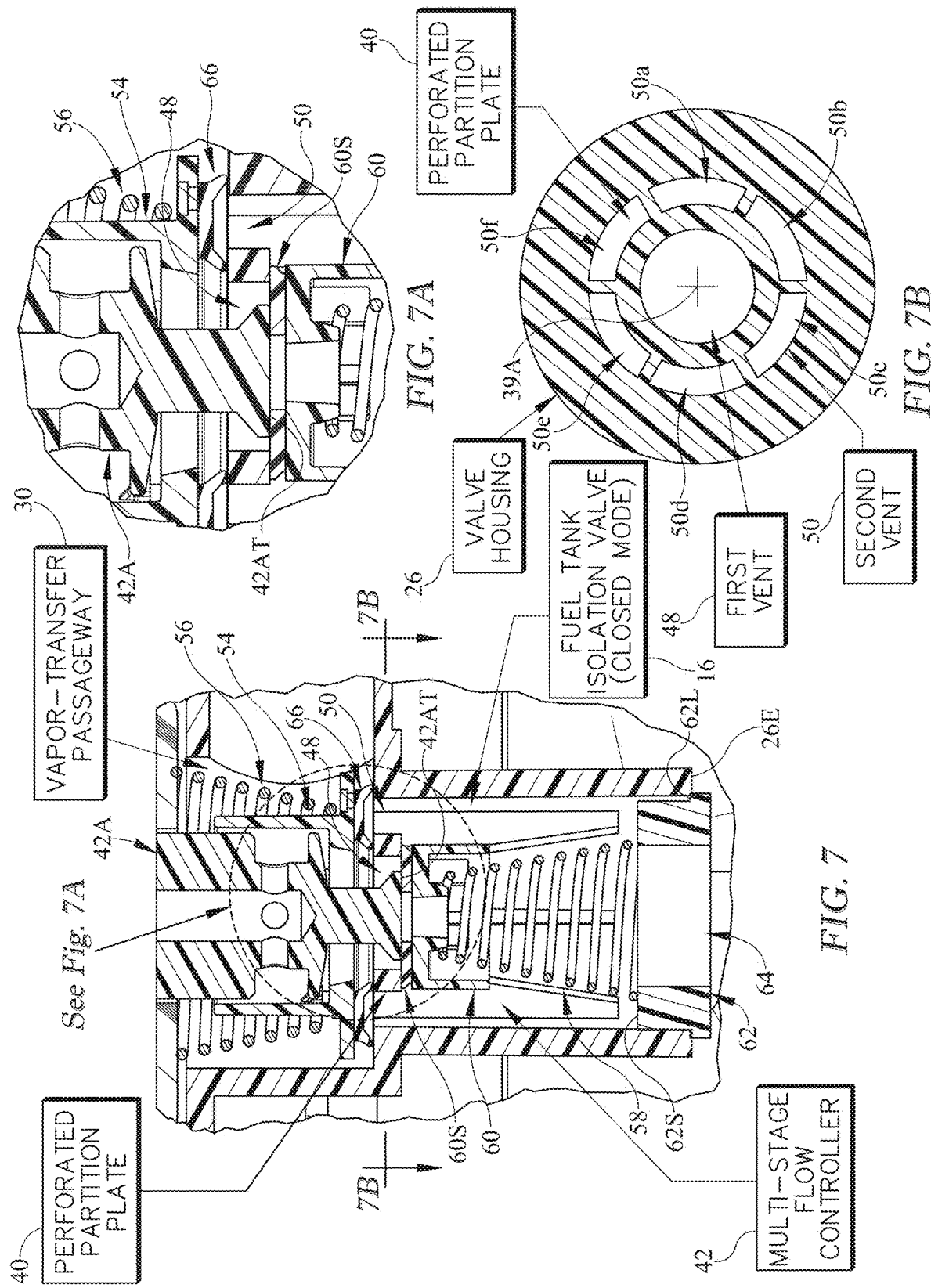

CARBON CANISTER WITH DIRECT CONNECT FUEL TANK ISOLATION VALVE

PRIORITY CLAIMS

This application claims priority under 35 U.S.C. § 119(e) to U.S. Provisional Application Ser. No. 63/257,084, filed Oct. 18, 2021, which is expressly incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a fuel tank vent valve.

Vehicle fuel systems include valves associated with a fuel tank and configured to vent pressurized or displaced fuel vapor from the vapor space in the fuel tank to a fuel-vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

SUMMARY

A tank venting system in accordance with the present disclosure includes a housing, a carbon bed located in a storage cavity defined by the housing, and a fuel tank isolation valve for regulating flow of fuel vapor between a fuel tank and the housing in a vehicle. The housing, or fuel-vapor recovery canister, is in fluid communication between the fuel tank and an engine in the vehicle to remove hydrocarbons in the fuel vapor flowing into and out of the fuel tank. The flow of fuel vapor is controlled to maintain the pressure of fuel vapor in the fuel tank at a certain pressure level or within a certain pressure range.

In the illustrative embodiments, the housing includes a media storage body formed to define a storage cavity that contains the carbon bed and a storage body closure that couples to the media storage body to close an opening to the storage cavity. The media storage body closure or cover is formed to include a cover panel that couples to the media storage body and a valve housing that extends from the cover panel.

In the illustrative embodiment, the valve housing is formed to define a vapor port in fluid communication with a fuel tank and a vapor-transfer passageway. The vapor-transfer passageway interconnects the storage cavity and the vapor port in fluid communication to transfer fuel vapor flowing to and from the fuel tank through the vapor port to the storage cavity of the media storage body. The fuel tank isolation valve of the tank venting system is located in the vapor-transfer passageway so as to regulate flow of fuel vapor in the vapor-transfer passageway between the vapor port and the storage cavity of the media storage body.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 7 is an enlarged view taken from FIG. 5;

FIG. 7A is an enlarged view taken from the circled region of FIG. 7; and

FIG. 7B is an enlarged sectional view taken along line 7B-7B of FIG. 7.

DETAILED DESCRIPTION

Figures 1, 2:
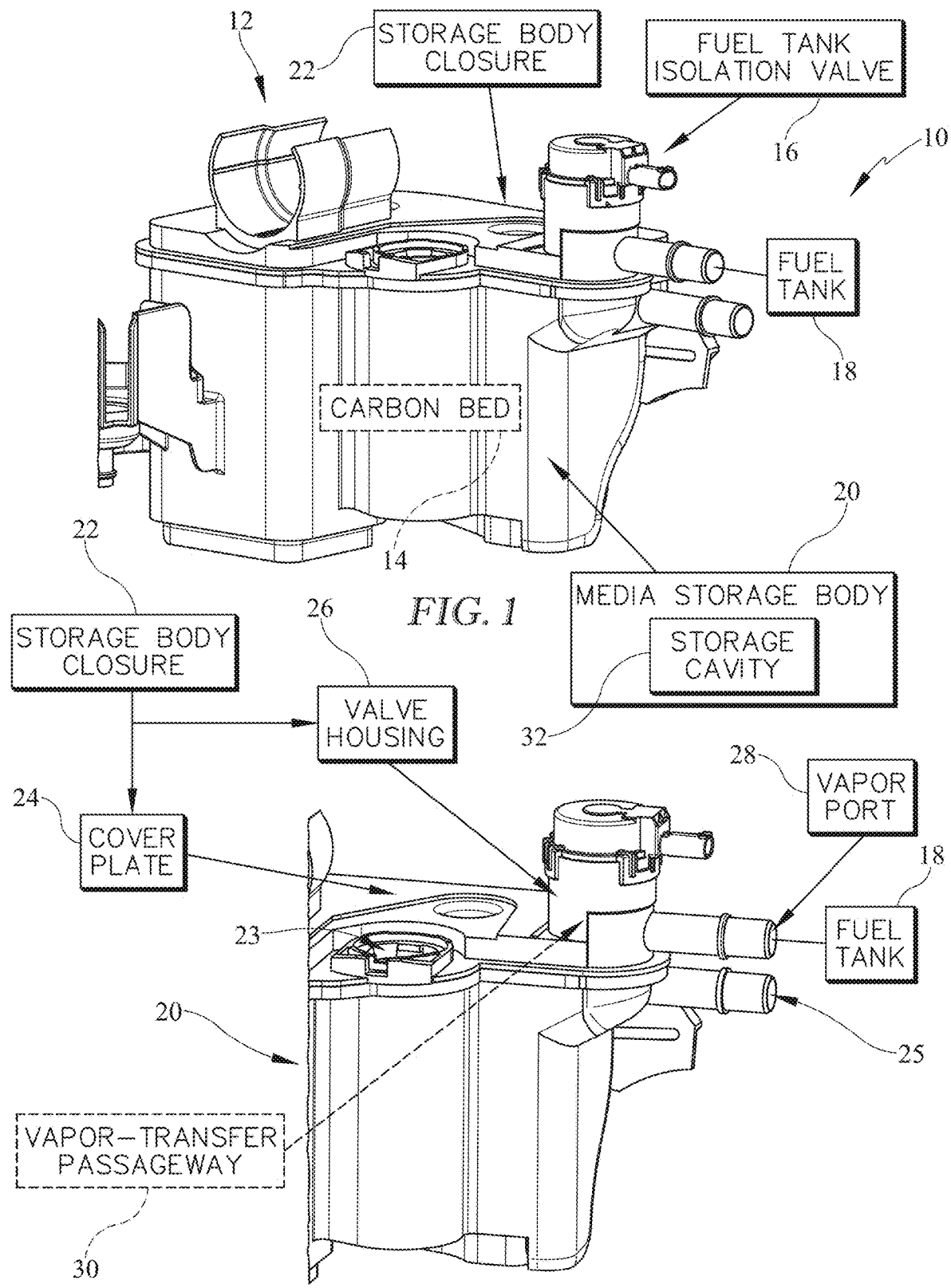
FIG. 1 is a diagrammatic perspective view of a tank venting system in accordance with the present disclosure comprising a housing shaped to include a media storage body defining a storage cavity and a storage body closure coupled to the storage body to close a top opening to the storage cavity, a carbon bed located in the storage cavity of the media storage body, and a fuel tank isolation valve to regulate flow of fuel vapor between a fuel tank and the storage cavity.
FIG. 2 is detail view of the tank venting system of FIG. 1 showing the storage body closure is formed to include a cover panel coupled to the media storage body to close the top opening of the storage cavity and a valve housing that extends from the cover panel, the valve housing shaped to define a vapor port in fluid communication with a fuel tank and a vapor-transfer passageway that interconnects the storage cavity and the vapor port in fluid communication to transfer fuel vapor flowing to and from the fuel tank through the vapor port to the storage cavity of the media storage body.

For the purposes of promoting an understanding of the principles of the disclosure, reference will now be made to a number of illustrative embodiments illustrated in the drawings and specific language will be used to describe the same.

An illustrative fuel tank venting system 10 comprises a housing 12, a carbon bed 14 located in a storage cavity 32 of the housing 12, and a fuel tank isolation valve 16 associated with that housing 12 as suggested in FIG. 1. Housing 12, or fuel-vapor recovery canister, includes a media storage body 20 formed to define storage cavity 32 and a storage body closure 22 configured to couple to storage body 20 to close a top opening 320 to storage cavity 32.

Figure 3:
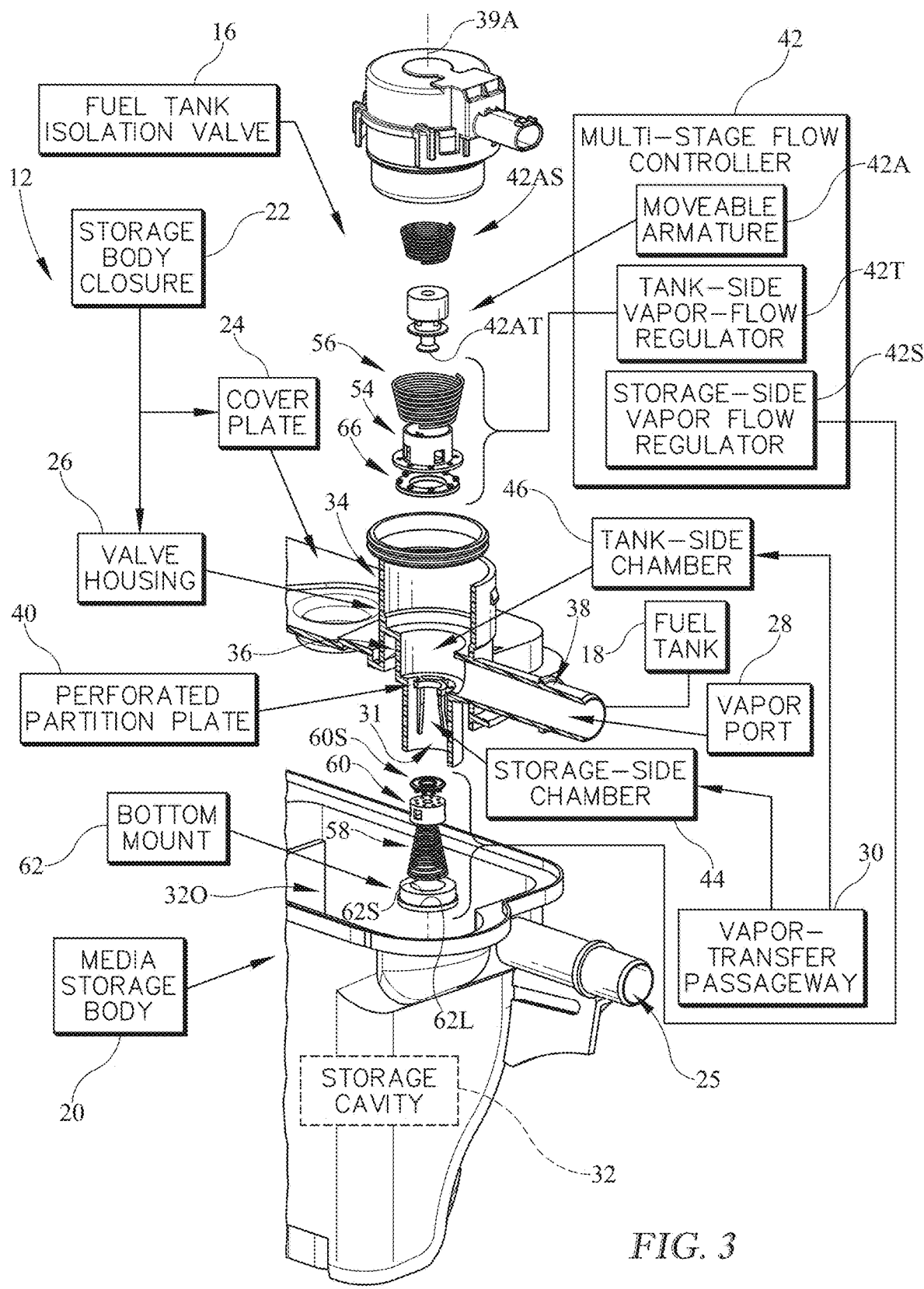
FIG. 3 is an exploded view of the tank venting system of FIG. 1 with a portion of the valve housing formed in the storage body closure broken away to show a perforated partition plate included in the fuel tank isolation valve that divides the vapor-transfer passageway to form a tank-side chamber that opens directly to the vapor port and a storage-side chamber that opens directly into the storage cavity of the storage body, and further showing the fuel tank isolation valve includes a multi-stage flow controller components configured to be installed in the respective chambers that are able to move relative to the stationary perforated partition plate to regulate flow of fuel vapor between the fuel tank and the media storage body.
Figure 4:
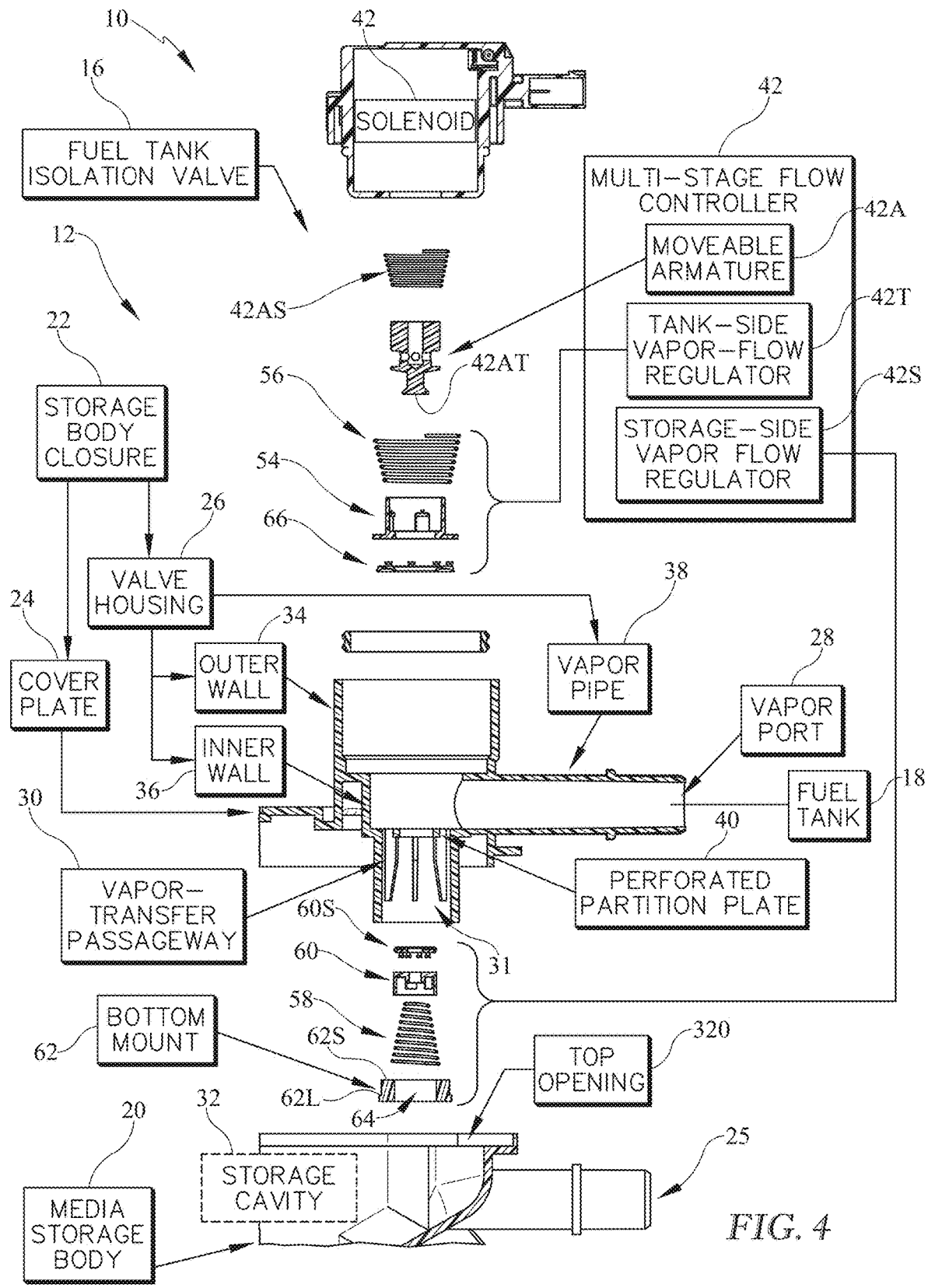
FIG. 4 is an exploded, cross-section view of the tank venting system of FIG. 1 showing the valve housing includes an outer wall that extends axially from the cover panel away from the storage cavity relative to an axis of the fuel tank isolation valve, an inner wall extends axially from the outer wall toward the storage cavity relative to the axis, and a vapor pipe that extends radially from the outer wall and forms the vapor port, and further showing the perforated partition plate extends between the inner wall of the valve housing.

Storage body closure 22 is formed to include a cover panel 24 and a valve housing 26 as shown in FIGS. 2-4. Cover panel 24 is configured to couple to media storage body 20 to close top opening 320 of storage cavity 32. Valve housing 26 extends from cover panel 24 is formed to define a vapor port 28 and a vapor-transfer passageway 30. Vapor port 28 is in fluid communication with a fuel tank 18. Vapor-transfer passageway 30 interconnects storage cavity 32 and vapor port 28 in fluid communication to transfer fuel vapor flowing to and from fuel tank 18 through vapor port 28 to storage cavity 32 of media storage body 20.

Vapor-transfer passageway 30 is arranged to interconnect storage cavity 32 and vapor port 28 to enable transfer fuel vapor flowing from fuel tank 18 through vapor port 28 to storage cavity 32 of media storage body 20 and to enable transfer of hydrocarbon-laden vapor flowing from storage cavity 32 of media storage body 20 through vapor port 28 to fuel tank 18. Fuel tank isolation valve 16 of tank venting system 10 is located in vapor-transfer passageway 30 so as to regulate flow of fuel vapor in vapor-transfer passageway 30 between vapor port 28 and storage cavity 32 of media storage body 20. Fuel tank isolation valve 16 is used onboard a vehicle (not shown) including an engine and a purge vacuum source (not shown) coupled to the engine and the media storage body.

Figure 5:
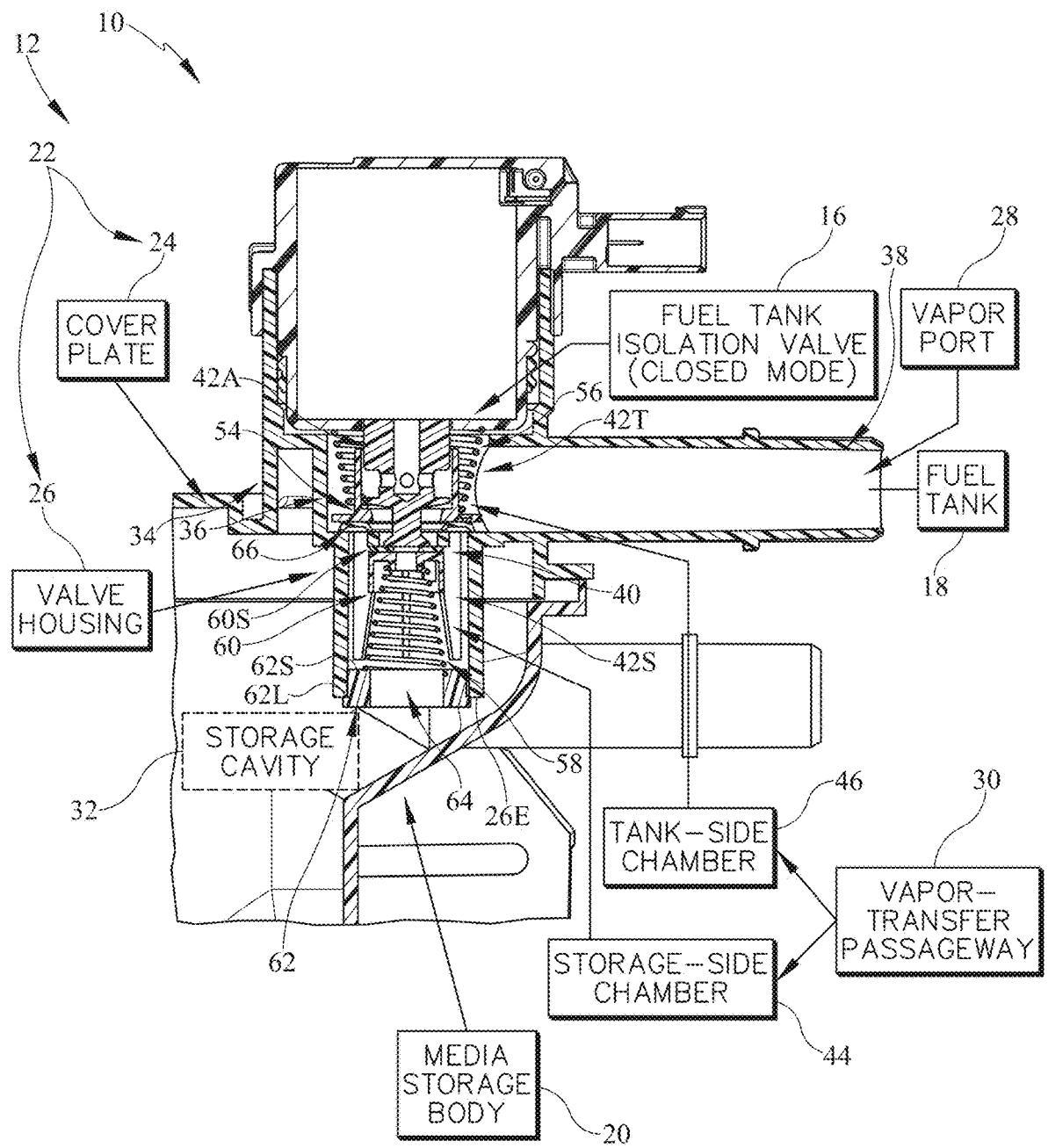
FIG. 5 is a sectional side elevation view of the tank venting system of FIG. 1 showing the fuel tank isolation valve of the tank venting system is located in the vapor-transfer passageway so as to regulate flow of fuel vapor in the vapor-transfer passageway between the vapor port and the storage cavity of the media storage body.

Housing 12 is a carbon canister in the illustrative embodiment and includes carbon bed 14 in storage cavity 32 to remove hydrocarbons in the fuel vapor flowing into and out of media storage body 20. Storage body closure 22 is molded to include valve housing 26 so that vapor-transfer passageway 30 is in direct fluid communication with storage cavity 32 as shown in FIG. 5.

Vapor-transfer passageway 30 is arranged to interconnect storage cavity 32 and vapor port 28 in fluid communication to transfer fuel vapor flowing to and from fuel tank 18 through vapor port 28 to storage cavity 32 of media storage body 20. Fuel tank isolation valve 16 is located in vapor-transfer passageway 30 formed in valve housing 26 to normally to isolate fuel tank 18 from media storage body 20 to block flow of the fuel vapor between tank 18 and media storage body 20.

In vehicles with a normal internal combustion engine, the fuel vapor from the fuel tank is vented directly to the surrounding atmosphere. Directly venting the fuel vapor to the surrounding atmosphere may be harmful to people and/or the environment.

However, in partially hybrid electric vehicles (PHEV), the internal combustion engine included in the vehicle operates intermittently and therefore the fuel tank system is frequently closed off from the atmosphere when not in use (i.e. the engine is not being used). Closing the system off from the atmosphere may reduce the harmful emissions to the surrounding environment, but may create a need to control/regulate the fuel vapor in the system.

The fuel vapor in the fuel tank may therefore be at a higher pressure or a lower vacuum pressure than normal engines, which may make opening fuel system lines when ready for use a challenge. Further, if the increased pressure in the fuel tank is not released, the fuel tank may become damaged or even explode.

Fuel tank systems may include a fuel tank isolation valve to control the flow fuel vapor and air between the fuel tank and a canister used to store the pressurized fuel vapor to release built up pressure in the fuel tank at different stages. The canister is configured to "clean" fuel vapor vented from the fuel tank during tank refueling. The canister may be in fluid communication with the engine, the fuel tank, and the atmosphere, which provides several leak paths for the fuel vapor.

In the illustrative embodiment, valve housing 26 in the storage body closure 22 integrates fuel tank isolation valve 16 in housing 12 to eliminate leak paths between fuel tank 18 and engine. Fuel vapor from fuel tank 18 flows through vapor port 28, through vapor-transfer passageway 30, and directly into storage cavity 32. An opening 31 to vapor-transfer passageway 30 opens directly into storage cavity 32 to put vapor-transfer passageway 30 in direct fluid communication with storage cavity 32. In the illustrative embodiment, an inner wall 36 of valve housing 26 defines opening 31 to vapor-transfer passageway 30.

Housing 12, or fuel-vapor recovery canister, includes media storage body 20 and storage body closure 22 as shown in FIGS. 1-5. Media storage body 20 is formed to define storage cavity 32. A carbon bed 14 is located in storage cavity 32 to absorb hydrocarbons in the fuel vapor flowing into and out of the media storage body 20. Storage body closure 22 is configured to couple to storage body 20 to close a top opening 320 to storage cavity 32.

Housing 12 is also formed to define an atmosphere vapor port 23 and an engine vapor port 25 as shown in FIGS. 1 and 2. Atmosphere vapor port 23 is arranged to interconnect storage cavity 32 of media storage body 20 and an atmosphere surrounding tank venting system 10 in fluid communication. Engine vapor port 25 is arranged to interconnect storage cavity 32 of media storage body 20 and engine in fluid communication.

In some embodiments, storage body closure 22 may be formed to define atmosphere vapor port 23 and engine vapor port 25. In other embodiments, media storage body 20 may be formed to define atmosphere vapor port 23 and engine vapor port 25. In the illustrative embodiment, media storage body 20 is formed to define one of the atmosphere vapor port 23 or the engine vapor port 25, while storage body closure 22 is formed to define the other.

Storage body closure 22 is formed to include cover panel 24 and valve housing 26 as shown in FIGS. 2-4. Cover panel 24 is configured to couple to media storage body 20 to close top opening 320 of storage cavity 32. Valve housing 26 extends from cover panel 24.

Valve housing 26 is formed to define vapor port 28 and vapor-transfer passageway 30 as shown in FIGS. 2-5. Vapor port 28 is in fluid communication with fuel tank 18. Vapor-transfer passageway 30 interconnects storage cavity 32 and vapor port 28 in fluid communication to transfer fuel vapor flowing to and from fuel tank 18 through vapor port 28 to storage cavity 32 of media storage body 20.

Valve housing 26 includes an outer wall 34, an inner wall 36, and a vapor pipe 38 as shown in FIGS. 3-6. Outer wall 34 extends axially from cover panel 24 away from storage cavity 32 relative to an axis 39A of fuel tank isolation valve 16. Inner wall 36 extends axially from outer wall 34 toward storage cavity 32 relative to axis 39A of fuel tank isolation valve 16. In the illustrative embodiment, inner wall 36 extends from the outer wall into storage cavity 32 so that a terminal end of inner wall 36 is located in storage cavity 32. Inner wall 36 is formed to define vapor-transfer passageway 30. Vapor pipe 38 extends radially from outer wall 34 and forms vapor port 28.

In the illustrative embodiment, vapor-transfer passageway 30 extends along axis 39A of fuel tank isolation valve 16, while vapor pipe 38 extends at an angle relative to vapor-transfer passageway 30 as shown in FIGS. 4 and 5. The opening 31 of vapor-transfer passageway 30 into storage cavity 32 is aligned with axis 39A of fuel tank isolation valve 16 in the illustrative embodiment as shown in FIGS. 4 and 5.

Fuel tank isolation valve 16 regulates fuel vapor flow through vapor-transfer passageway 30 to regulate pressure of fuel vapor within fuel tank 18 in accordance with predetermined pressure targets. Fuel tank isolation valve 16 includes a stationary perforated partition plate 40 mounted in vapor-transfer passageway 30 and a multi-stage flow controller 42 that is mounted for movement in vapor-transfer passageway 30 alongside and relative to perforated partition plate 40 as shown in FIGS. 3-5. Multi-stage flow controller 42 is configured to regulate flow of fuel vapor through separate central and orbital vents formed in perforated partition plate 40.

Perforated partition plate 40 is arranged to divide vapor-transfer passageway 30 into a storage-side chamber 44 that communicates directly with storage cavity 32 of media storage body 20 and an overlying tank-side chamber 46 that communicates with vapor port 28 as shown in FIGS. 4 and 5. Perforated partition plate 40 is formed to include a central vent aperture 48 to establish a first vent 48 and six orbital vent apertures 50a-f (see FIG. 6) establishing a second vent 50 and surrounding the central vent aperture 48.

In the illustrative embodiment, perforated partition plate 40 is formed to include a round central vent aperture 48 centered on central vertical axis 39A and six arc-shaped orbital vent apertures 50a-f arranged to surround the round central vent aperture 48 and lie in radially spaced relation from central vertical axis 39A and circumferentially spaced-apart relation to one another. Perforated partition plate 40 is mounted in a stationary position in the vapor-transfer passageway 30 of valve housing 26.

In the illustrative embodiment, perforated partition plate 40 is arranged within inner wall 36. Perforated partition plate 40 is located in the vapor-transfer passageway 30 defined by the inner wall 36 of the valve housing 26.

In the illustrative embodiment, cover panel 24 and valve housing 26 of storage body closure 22 are a monolithic component of plastic material. Cover panel 24 and valve housing 26 of storage body closure 22 and stationary perforated partition plate 40 of fuel tank isolation valve 16 are a monolithic component. In the illustrative embodiment, outer wall 34, inner wall 36, and vapor pipe 38 of valve housing 12 along with cover panel 24 and stationary perforated partition plate 40 are a monolithic component.

In the illustrative embodiment, the fuel tank isolation valve 16 includes a solenoid 42 for use with multi-stage flow controller 42 as suggested in FIG. 1. The solenoid 42 may be used to control the multi-stage flow controller 42 during tank refueling activities. Solenoid 42 can be energized during different open modes of fuel tank isolation valve 16. In some embodiments, the multi-stage flow controller 42 of the fuel tank isolation valve may be mechanically activated using a suitable mechanical system using vacuum and pressure to control movement of the controller 42.

Perforated partition plate 40 of fuel tank isolation valve 16 is located in vapor-transfer passageway 30 formed in housing 12 as shown in FIGS. 3 and 4. Perforated partition plate 40 partitions vapor-transfer passageway 30 to define a tank-side chamber 46 above perforated partition plate 40 for conducting fuel vapor between the vapor port 28 and the center and orbital vents 48, 50 formed in perforated partition plate 40 and a storage-side chamber 44 below perforated partition plate 40 for conducting fuel vapor between the storage cavity 32 of media storage body 20 and the center and orbital vents 48, 50. In the illustrative embodiment, inner wall 36 defines vapor-transfer passageway 30 such that inner wall 36 defines storage-side chamber 44 and tank-side chamber 46 of vapor-transfer passageway 30.

Multi-stage flow controller 42 is configured normally to engage perforated partition plate 40 to close the first and second vents 48, 50 formed in perforated partition plate 40 so as to block fuel vapor flow from vapor port 28 to storage cavity 32 through the vapor-transfer passageway 30 formed by housing 12 so that fuel tank 18 is normally isolated from fluid communication with storage cavity 32 of media storage body 20. However, multi-stage flow controller 42 is configured in to disengage from perforated partition plate 40 in several different ways so as to regulate flow of fuel vapor in vapor-transfer passageway 30 between fuel tank 18 and storage cavity 32 of media storage body 20 independently through central vent aperture 48 and also through several orbital vent apertures 50a-f during (1) early and later stages of fuel tank 18 refueling activity, (2) development of unwanted vacuum conditions in fuel tank 18, and (3) development of unwanted over-pressure conditions in fuel tank 18.

Multi-stage flow controller 42 includes a tank-side vapor-flow regulator 42T and a storage-side vapor-flow regulator 42S as suggested in FIGS. 3 and 4. Tank-side vapor-flow regulator 42T is located above perforated partition plate 40 in tank-side chamber 46 that is formed in the vapor-transfer passageway 30 to communicate fuel vapor to and from fuel tank 18 via vapor port 28 coupled to fuel tank 18. Storage-side vapor-flow regulator 42S is located under perforated partition plate 40 in the storage-side chamber 44 that is formed in vapor-transfer passageway 30 to communicate fuel vapor to and from storage cavity 32 of media storage body 20. Each of tank-side and storage-side vapor-flow regulators 42T, 42S is aligned to move upwardly and downwardly relative to perforated partition plate 40 along a single vertical axis 39A that extends through the vapor-transfer passageway 30.

Multi-stage flow controller 42 also includes a spring-biased movable armature 42A that is operationally coupled to solenoid 42 and is arranged to extend into the vapor-transfer passageway 30 as shown in FIG. 5 and move relative to the stationary perforated partition plate 40 along the single vertical axis 39A that extends through the tank-side chamber 46, the central vent aperture 48 formed in perforated partition plate 40, and the storage-side chamber 44. Movable armature 42A cooperates with tank-side and storage-side vapor-flow regulators 42T, 42S when fuel tank isolation valve 16 is in a normal CLOSED mode to block flow of fuel vapor through the central and orbital vent apertures 48, 50 formed in perforated partition plate 40 so that fuel vapor cannot flow through the vapor-transfer passageway 30 between fuel tank 18 and storage cavity 32 of media storage body 20 and therefore fuel tank 18 normally is isolated from the media storage body 20.

Tank-side and storage-side vapor-flow regulators 42T, 42S are configured to move in the vapor-transfer passageway 30 relative to the stationary perforated partition plate 40 to close, partly open, and open vents 48, 50 formed in perforated partition plate 40 in response to changes in pressure of fuel vapor extant in the vapor-transfer passageway 30 and in fuel tank 18. Movable armature 42A is spring-biased normally to move toward storage-side vapor-flow regulator 42S and is operationally linked to solenoid 42 to move upwardly away from storage-side vapor-flow regulator 42S when solenoid 42 is energized. Movable armature 42A includes a distal tip 42AT that is arranged to extend into the vapor-transfer passageway 30 and move therein in response to a pushing force generated by an armature-biasing spring 42AS and actuation of solenoid 42 to assume various positions therein to cooperate with storage-side vapor-flow regulator 42S so as to close or partly open the central vent 48 formed in the perforated partition plate 40.

As mentioned above, fuel tank isolation valve 16 may be important to regulate the pressure of fuel vapor in the system of hybrid vehicles. Fuel tank isolation valve 16 is normally closed to block the flow of fuel vapor from tank 18 to media storage body 20 as shown in FIG. 5. Fuel tank isolation valve 16 has different open modes to regulate the flow of fuel vapor between fuel tank 18 and media storage body 20 based on different conditions of the system.

In the case of over-pressure conditions, valve 16 changes to one of the open modes to allow a release a large amount of pressure from fuel tank 18. Conversely, if there is vacuum conditions in fuel tank 18, fuel tank isolation valve 16 may change to another opened mode to alleviate unwanted vacuum conditions. Once the vehicle switches to using engine, fuel tank isolation valve 16 may change to one of open modes to allow the fuel vapor to flow from fuel tank 18 through media storage body 20 and to the engine to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 16 changes from closed mode to first opened mode to vent some displaced fuel vapor from fuel tank 18. After refueling begins and fuel is being discharged at a constant rate into fuel tank 18, fuel tank isolation valve 16 changes to second opened mode to vent more displaced fuel vapor.

As suggested in FIG. 3, fuel tank isolation valve 16 comprises a perforated partition plate 40, a multi-stage flow controller 42, and an armature-biasing solenoid 42. Multi-stage flow controller 42 includes a tank-side vapor-flow regulator 42T comprising a top hat-shaped spring cap 54 and a large-diameter compression (vacuum) spring 56; a movable armature 42A; and a storage-side vapor-flow regulator 42S comprising a narrow-diameter compression (pressure) spring 58, a spring cap 60, and a bottom mount member 62.

Bottom mount member 62 is independent of housing 12. Bottom mount member 62 is located in an opening 31 of vapor-transfer passageway 30 that opens directly into storage cavity 32 to provide a shoulder surface 62S. Shoulder surface 62S is engaged by other components of fuel tank isolation valve 16 to retain fuel tank isolation valve 16 in the opening of vapor-transfer passageway 30.

Bottom mount member 62 is located in the vapor-transfer passageway 30 below the compression spring 58 and spring cap 60 so that the spring 58 engages with the bottom mount member 62 to bias the spring cap 60 with the O-ring seal 60S into engagement with the underside of perforated partition plate 40. The bottom mount member 62 is shaped to include a hole 64 that opens into storage cavity 32 and vapor-transfer passageway 30 so as to allow pressurized fuel vapor to flow through bottom mount member 62. In some embodiments, bottom mount member 62 may be fixed to housing 12 in vapor-transfer passageway 30 of housing 12.

As suggested in FIG. 3, movable armature 42A, spring 42AS, and tank-side vapor-flow regulator 42T included in fuel tank isolation valve 16 have been installed in the tank-side chamber 46 of the vapor-transfer passageway 30, while storage-side vapor-flow regulator 42S has been installed in the storage-side chamber 44. Movable armature 42A, spring 42AS, and tank-side vapor-flow regulator 42T are installed in tank-side chamber 46 of the vapor-transfer passageway 30 through an opening 260 in valve housing 26. Top-side vapor-transfer passageway closure 68 is then attached to valve housing 26 to close tank-side chamber 46 of vapor-transfer passageway 30.

The installation of movable armature 42A, spring 42AS, and tank-side vapor-flow regulator 42T causes a downwardly extending tip 42AT of movable armature 42A to extend along the single vertical axis 39A into the first vent 48 established by central vent aperture 48 and formed in perforated partition plate 40. The installation of movable armature 42A, spring 42AS, and tank-side vapor-flow regulator 42T also causes seal ring 66 of tank-side vapor-flow regulator 42T to engage an annular outer perimeter region of topside of perforated partition plate 40 to block fuel vapor from passing through the second vent 50 established by six orbital vent apertures 50a-f (see FIG. 6) surrounding the central vent aperture 48. The round central vent aperture 48 and the six surrounding circumferentially spaced-apart arcuate orbital vent apertures 50a-f formed in perforated partition plate 40 of fuel tank isolation valve 16 are shown for example in FIG. 6.

Storage-side vapor-flow regulator 42S is installed through opening 31 of vapor-transfer passageway 30. Spring cap 60 and spring 58 are inserted into the storage-side chamber 44 and bottom mount member 62 is then inserted into opening 31 of vapor-transfer passageway 30 and fixed to inner wall 36 of valve housing 26. The installation of storage-side vapor-flow regulator 42S causes O-ring seal 60S of storage-side vapor-flow regulator 42S to engage the downwardly facing surface on distal tip 42AT of movable armature 42A and the downwardly facing surface on the annular inner perimeter region of underside of perforated partition plate 40 that surrounds the central vent aperture 48. Then storage body closure 22 is coupled to media storage body 20 to close off top opening 320 of storage cavity 32.

Tank venting system 10 includes housing 12, carbon bed 14, and fuel tank isolation valve 16 as shown in FIGS. 1 and 2. Housing 12 includes media storage body 20 formed to define storage cavity 32 and a storage body closure 22 coupled to storage body 20 to close top opening 320 to storage cavity 32.

Storage body closure 22 includes cover panel 24 that couples to storage body 20 and valve housing 26 that extends from cover panel 24. Valve housing 26 is formed to define vapor port 28 in fluid communication with fuel tank 18 and vapor-transfer passageway 30 arranged to interconnect storage cavity 32 and vapor port 28 to enable transfer of fuel vapor flowing from fuel tank 18 through vapor port 28 to storage cavity 32 of media storage body 20 and to enable transfer of hydrocarbon-laden vapor flowing from storage cavity 32 of media storage body 20 through vapor port 28 to fuel tank 18.

Cover panel 24 and valve housing 26 of storage body closure 22 are a monolithic component. In some embodiments, cover panel 24 and valve housing 26 of storage body closure 22 are a monolithic component of plastic material in the illustrative embodiment.

Cover panel 24 may be coupled to storage body 20 with fasteners in some embodiments. In other embodiments, cover panel 24 may be welded to storage body 20. In other embodiments, another suitable method of fixing cover panel 24 to storage body 20 may be used.

Carbon bed 14 is located in storage cavity 32 of media storage body 20. Carbon bed 14 is configured to absorb hydrocarbons in the fuel vapor flowing into and out of media storage body 20 through vapor-transfer passageway 30.

Fuel tank isolation valve 16 is located in vapor-transfer passageway 30 of storage body closure 22. Fuel tank isolation valve 16 is configured to regulate flow of fuel vapor in vapor-transfer passageway 30 between vapor port 28 and storage cavity 32 of media storage body 20.

Figure 6:
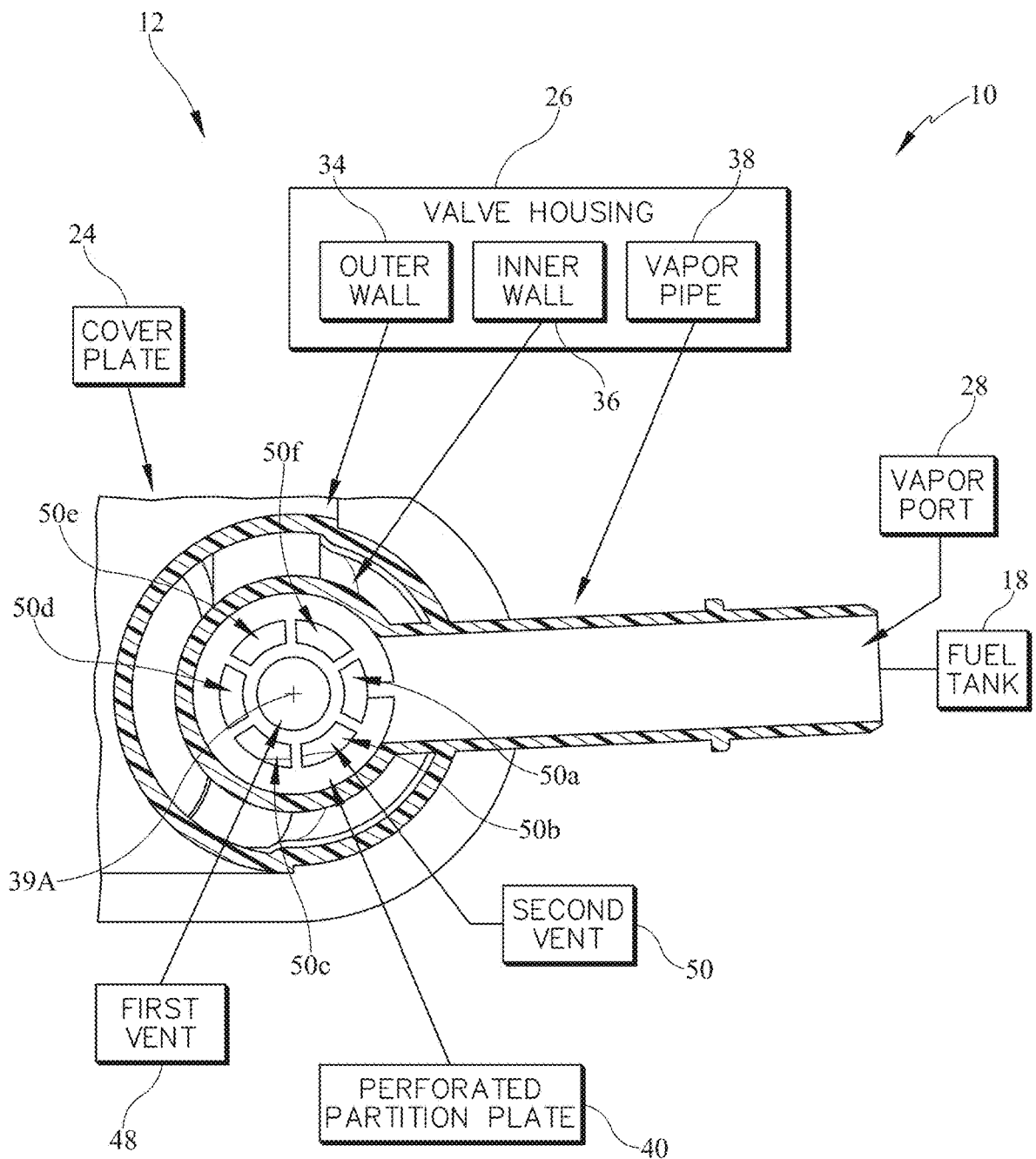
FIG. 6 is an enlarged sectional view of FIG. 5 showing that the stationary perforated partition plate is formed to include a large-diameter central vent aperture establishing the first vent and six relatively smaller oblong arc-shaped orbital vent apertures surrounding the central vent aperture and establishing the second vent.

Valve housing 26 includes outer wall 34, inner wall 36, and vapor pipe 38 as shown in FIGS. 4-6. Outer wall 34 extends axially from cover panel 24 away from storage cavity 32 relative to central vertical axis 39A of fuel tank isolation valve 16. Inner wall 36 extends axially from outer wall 34 toward storage cavity 32 relative to axis 39A. Vapor pipe 38 extends radially from outer wall 34. Inner wall 36 defines vapor-transfer passageway 30 and vapor pipe 38 forms vapor port 28 in the illustrative embodiment.

Fuel tank isolation valve 16 includes stationary perforated partition plate 40 located in vapor-transfer passageway 30 defined by inner wall 36 of valve housing 26 as shown in FIGS. 3-5. Stationary perforated partition plate 40 partitions vapor-transfer passageway 30 to establish tank-side chamber 46 communicating with vapor port 28 on a first side of stationary perforated partition plate 40 and storage-side chamber 44 communicating with storage cavity 32 of media storage body 20 on an opposite second side of stationary perforated partition plate 40.

Fuel tank isolation valve 16 further includes storage-side vapor-flow regulator 42S and a tank-side vapor-flow regulator 42T as shown in FIGS. 3-5. Storage-side vapor-flow regulator 42S includes movable storage-side closure 60 and storage-side compression spring 58 having a first end engaging movable storage-side closure 60 and an opposite second end acting against bottom mount member 62 normally to urge movable storage-side closure 60 to engage the second-side surface of stationary perforated partition plate 40 to regulate flow of fuel vapor through vent 48 formed in stationary perforated partition plate 40.

Bottom mount member 62 is independent of storage body closure 22 in the illustrative embodiment. Bottom mount member 62 is located in bottom opening 31 of vapor-transfer passageway 30 that opens directly into storage cavity 32. Bottom mount member 62 provides shoulder surface 62S that is engaged by other components of fuel tank isolation valve 16 to retain fuel tank isolation valve 16 in storage-side chamber 44 of vapor-transfer passageway 30.

In the illustrative embodiment, bottom mount member 62 is formed to include a annular lip 62L as shown in FIGS. 3-5. Annular lip 62L engages an inner end 26E of valve housing 26. Inner end 26E axially locates bottom mount member 62 relative to valve housing 26 so that when bottom mount member 62 is inserted into opening 31, annular lip 62L engages inner end 26E to prevent bottom mount member 62 from being inserted further into vapor-transfer passageway 30.

The invention claimed is:

1. A tank venting system comprising
a housing including a media storage body formed to define a storage cavity and a storage body closure coupled to the media storage body to close a top opening to the storage cavity, the storage body closure including a cover panel that couples to the media storage body and a valve housing that extends from the cover panel and formed to define a vapor port in fluid communication with a fuel tank and a vapor-transfer passageway arranged to interconnect the storage cavity and the vapor port to enable transfer of fuel vapor flowing from the fuel tank through the vapor port to the storage cavity of the media storage body and to enable transfer of hydrocarbon-laden vapor flowing from the storage cavity of the media storage body through the vapor port to the fuel tank,
a carbon bed located in the storage cavity of the media storage body that is configured to absorb hydrocarbons in the fuel vapor flowing into and out of the media storage body through the vapor-transfer passageway, and
a fuel tank isolation valve located in the vapor-transfer passageway of the storage body closure that is configured to regulate flow of fuel vapor in the vapor-transfer passageway between the vapor port and the storage cavity of the media storage body,
wherein the fuel tank isolation valve includes a stationary perforated partition plate located in the vapor-transfer passageway defined by the valve housing to partition the vapor-transfer passageway to establish a tank-side chamber communicating with the vapor port on a first side of the stationary perforated partition plate and a storage-side chamber communicating with the storage cavity of the media storage body on an opposite second side of the stationary perforated partition plate, and
wherein the valve housing includes an outer wall that extends axially from the cover panel away from the storage cavity relative to a central vertical axis of the fuel tank isolation valve, an inner wall extends axially from the outer wall relative to the axis into the storage cavity, and a vapor pipe that extends radially from the outer wall, the inner wall defines the vapor-transfer passageway such that the vapor-transfer passageway extends axially relative to the central vertical axis and opens into the storage cavity, and the vapor pipe forms the vapor port.

2. The tank venting system of claim 1, wherein the cover panel and the valve housing of the storage body closure are a monolithic component of plastic material.

3. The tank venting system of claim 2, wherein the fuel tank isolation valve includes a bottom mount member independent of the storage body closure that is located in a bottom opening of the vapor-transfer passageway that opens directly into the storage cavity to provide a shoulder surface engaged by other components of the fuel tank isolation valve to retain the fuel tank isolation valve in the bottom opening of the vapor-transfer passageway.

4. The tank venting system of claim 1, wherein the fuel tank isolation valve further includes a storage-side vapor-flow regulator including a movable storage-side closure, a bottom mount member located in the storage-side chamber of the vapor-transfer passageway, and a storage-side compression spring having a first end engaging the movable storage-side closure and an opposite second end acting against the bottom mount member normally to urge the movable storage-side closure to engage a second-side surface of the stationary perforated partition plate to regulate flow of fuel vapor through a vent formed in the stationary perforated partition plate.

5. The tank venting system of claim 1, wherein the outer wall, the inner wall, and the vapor pipe of the valve housing, the cover panel, and the stationary perforated partition plate are a monolithic component.

6. The tank venting system of claim 1, wherein the fuel tank isolation valve includes a bottom mount member independent of the storage body closure that is located in a bottom opening of the vapor-transfer passageway defined by the inner wall of the valve housing that opens directly into the storage cavity to provide a shoulder surface engaged by other components of the fuel tank isolation valve to retain the fuel tank isolation valve in the bottom opening of the vapor-transfer passageway, and wherein the bottom mount member includes a through hole that opens to the vapor-transfer passageway and the storage cavity of the media storage body.

7. The tank venting system of claim 1, wherein the cover panel and the valve housing of the storage body closure and the stationary perforated partition plate of the fuel tank isolation valve are a monolithic component.

8. A tank venting system comprising
a media storage body formed to define a storage cavity,
a storage body closure coupled to the media storage body to close a top opening to the storage cavity, the storage body closure including a cover panel that couples to the media storage body and a valve housing that extends from the cover panel and formed to define a vapor port in fluid communication with a fuel tank and a vapor-transfer passageway arranged to interconnect the storage cavity and the vapor port to enable transfer of fuel vapor flowing from the fuel tank through the vapor port to the storage cavity of the media storage body and to enable transfer of hydrocarbon-laden vapor flowing from the storage cavity of the media storage body through the vapor port to the fuel tank, and
a fuel tank isolation valve located in the vapor-transfer passageway of the storage body closure that is configured to regulate flow of fuel vapor in the vapor-transfer passageway between the vapor port and the storage cavity of the media storage body,
wherein the valve housing includes an outer wall that extends axially from the cover panel away from the storage cavity relative to a central vertical axis of the fuel tank isolation valve, an inner wall extends axially from the outer wall relative to the axis into the storage cavity, and a vapor pipe that extends radially from the outer wall, the inner wall defines the vapor-transfer passageway, and the vapor pipe forms the vapor port, and
wherein the fuel tank isolation valve includes a stationary perforated partition plate located in the vapor-transfer passageway defined by the inner wall of the valve housing to partition the vapor-transfer passageway to establish a tank-side chamber communicating with the vapor port on a first side of the stationary perforated partition plate and a storage-side chamber communicating with the storage cavity of the media storage body on an opposite second side of the stationary perforated partition plate.

9. The tank venting system of claim 8, wherein the cover panel and the valve housing of the storage body closure are a monolithic component of plastic material.

10. The tank venting system of claim 8, wherein the inner wall defines the vapor-transfer passageway such that the vapor-transfer passageway extends axially relative to the central vertical axis and opens into the storage cavity, and the vapor pipe forms the vapor port.

11. The tank venting system of claim 8, wherein the fuel tank isolation valve includes a bottom mount member independent of the storage body closure that is located in a bottom opening of the vapor-transfer passageway defined by the inner wall of the valve housing that opens directly into the storage cavity to provide a shoulder surface engaged by other components of the fuel tank isolation valve to retain the fuel tank isolation valve in the bottom opening of the vapor-transfer passageway, and wherein the bottom mount member includes a through hole that opens to the vapor-transfer passageway and the storage cavity of the media storage body.

12. A tank venting system comprising
a media storage body formed to define a storage cavity,
a storage body closure coupled to the media storage body to close a top opening to the storage cavity, the storage body closure including a cover panel that couples to the media storage body and a valve housing that extends from the cover panel and formed to define a vapor port in fluid communication with a fuel tank and a vapor-transfer passageway arranged to interconnect the storage cavity and the vapor port to enable transfer of fuel vapor flowing from the fuel tank through the vapor port to the storage cavity of the media storage body and to enable transfer of hydrocarbon-laden vapor flowing from the storage cavity of the media storage body through the vapor port to the fuel tank, and
a fuel tank isolation valve located in the vapor-transfer passageway of the storage body closure that is configured to regulate flow of fuel vapor in the vapor-transfer passageway between the vapor port and the storage cavity of the media storage body,
wherein the fuel tank isolation valve includes a stationary perforated partition plate located in the vapor-transfer passageway to partition the vapor-transfer passageway to establish a tank-side chamber communicating with the vapor port on a first side of the stationary perforated partition plate and a storage-side chamber communicating with the storage cavity of the media storage body on an opposite second side of the stationary perforated partition plate, and
wherein the cover panel and the valve housing of the storage body closure are a monolithic component of plastic material.

13. The tank venting system of claim 12, wherein the fuel tank isolation valve includes a bottom mount member independent of the storage body closure that is located in a bottom opening of the vapor-transfer passageway defined by the inner wall of the valve housing that opens directly into the storage cavity to provide a shoulder surface engaged by other components of the fuel tank isolation valve to retain the fuel tank isolation valve in the bottom opening of the vapor-transfer passageway, and wherein the bottom mount member includes a through hole that opens to the vapor-transfer passageway and the storage cavity of the media storage body.

* * * * *